United States Patent Office 3,655,746
Patented Apr. 11, 1972

3,655,746
PROCESS FOR PRODUCING MONOSODIUM GLUTAMATE
Tetsuya Shiraishi, Kakogawa, Jun Utsugi, Takasago, Koji Tanaka, Kakogawa, and Yasunori Tokuda, Takasago, Japan, assignors to Takeda Chemical Industries, Ltd., Osaka, Japan
No Drawing. Filed Apr. 23, 1970, Ser. No. 31,394
Claims priority, application Japan, Apr. 23, 1969, 44/31,917
Int. Cl. C07c 99/12
U.S. Cl. 260—527 N          2 Claims

ABSTRACT OF THE DISCLOSURE

Process for producing monosodium glutamate, which comprises contacting a glutamic acid fermentation broth at a pH between about 5 and about 9 with an amount of 1 litre by wet volume of a strongly basic anion exchange resin relative to about 0.2 to 0.6 molecular equivalent at the anionic impurities contained in said broth; adding to the effluent from the resin a stoichiometric amount of sodium hydroxide relative to the glutamic acid contained therein; and recovering the crystals of monosodium glutamate thus obtained.

---

The present invention relates to a process for producing monosodium glutamate (hereinafter referred to briefly as MSG) from a glutamic acid fermentation broth and, more particularly, to a process for producing MSG directly from said broth in a high purity and in a high yield, without passing through the intermediate step for crystallization of glutamic acid hydrochloride, glutamic acid or a glutamate (e.g. calcium glutamate). The said process comprises selectively adsorbing the impurities contained in said broth on a strongly basic anion exchange resin.

Heretofore a number of processes have been proposed for the preparation of MSG from a glutamic acid fermentation broth, but those processes invariably involve the steps of allowing glutamic acid hydrochloride, calcium glutamate, zinc glutamate, ammonium glutamate or glutamic acid to crystallize from the broth, then recovering those crystals and subsequently neutralizing them with, for instance, sodium hydroxide or sodium carbonate to obtain MSG.

Those processes not only require complicated steps but also result in unsatisfactory yields. Aside from those processes, a process is known in which an organic solvent is used to directly allow MSG to crystallize from the broth, but the resulting crystals are so low in purity that they must require aftertreatment.

In view of overcoming those disadvantages of the conventional processes the present inventors have carried out an intensive study and obtained the following findings:

(1) Soluble anionic impurities (hereinafter referred to merely "soluble impurities" or "anionic impurities"), particularly organic acids other than amino acids (samely defined hereinafter) contained in the broth and coloring matters can be specifically separated from glutamic acid by adsorbing the impurities and coloring matters on a strongly basic anion exchange resin;

(2) The said separation can be effected regardless of the molecular ratio of organic acids and glutamic acid;

(3) For the separation, it is necessary to fix the pH as well as the ratio of soluble impurities to the amount of the resin in a certain range and (4) Pure crystals of MSG separate out by adding sodium hydroxide and concentrating the effluent. The present invention is a culmination of the above findings.

Thus, the main object of the present invention is to give a simple process for producing MSG. Another object of the invention is to give a process for producing MSG in a good purity and in a high yield.

Table 1 shows the process of the instant invention in comparison with the conventional two processes.

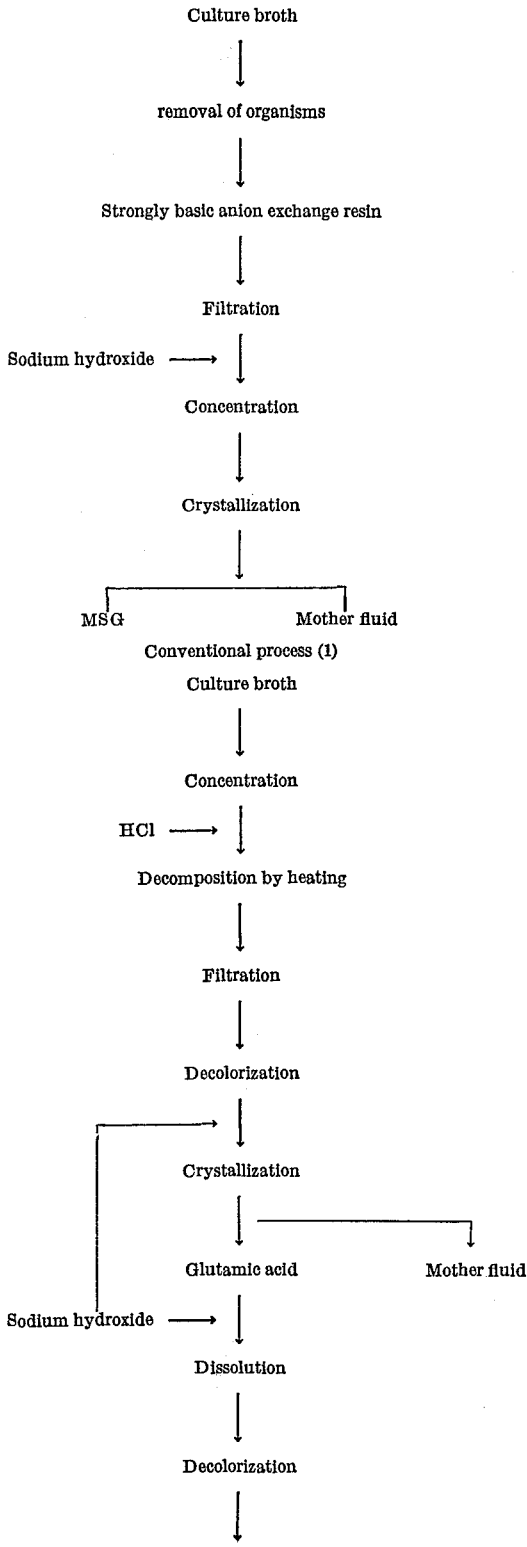

TABLE 1

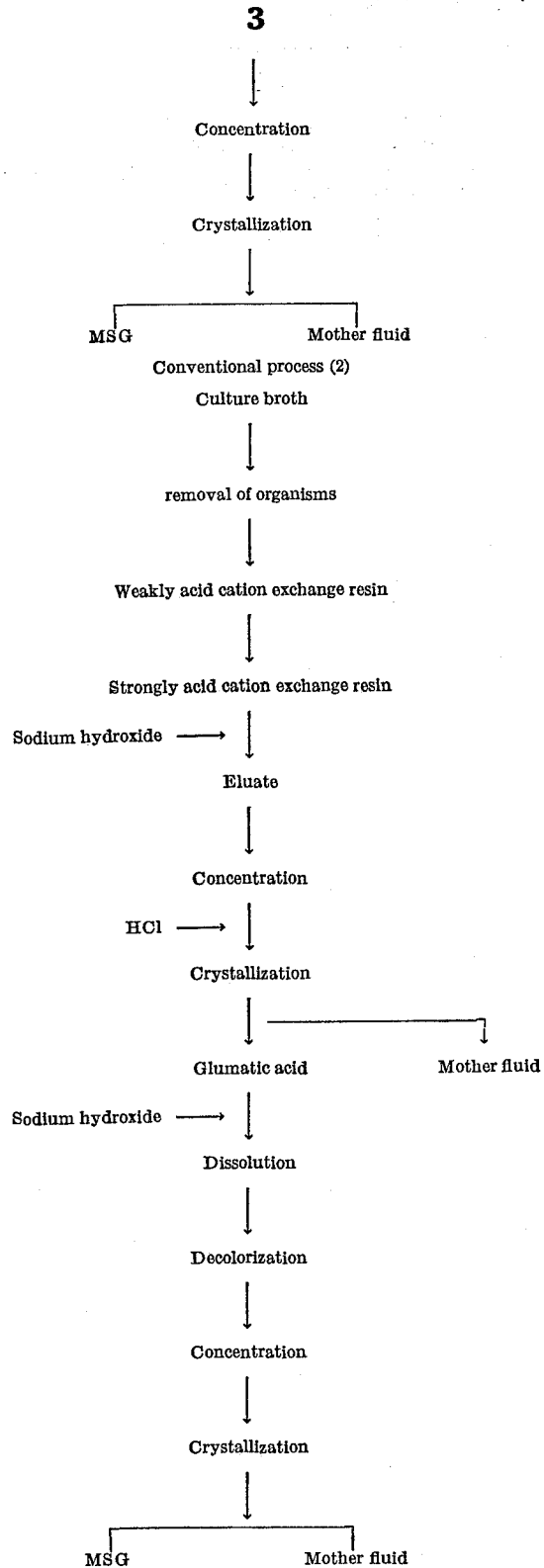

Compared with those conventional processes, the present process offers the following advantages;

(1) Since the intermediate steps for the crystallization of glutamic acid as in conventional processes (I) and (II) are omitted, the process of the present invention is less complicated, resulting in MSG in a good yield and in good purity.

|  | Yield (percent) |
|---|---|
| Process (1) | 80 |
| Process (2) | 83 |
| Process of the present invention | 90 |

(2) While the conventional purification processes employing cation exchange resin involve the adsorption and desorption of glutamic acid itself on and from resins, the resin in the present invention is employed for the adsorption of impurities, which makes it possible to purify by far a greater quantity of broth per unit volume of the resin. By way of illustration, more than about 3 times as much volume of broth as that of Process (2) can be treated according to the present invention.

(3) The solution obtainable upon concentration of the effluent from the strongly basic anion exchange resin contains ammonium glutamate and is substantially free of impurities. Thus, while ammonium glutamate is converted to MSG by adding sodium hydroxide into the solution, accompanying ammonia can be recovered.

(4) Since the mother fluid obtained in the crystallization of MSG also contains various amino acids in suitable proportions, it can be used to advantage as, for instance, a liquid condiment. By way of illustration, a resultant liquid in Example 1 contains aspartic acid, glycine, alanine, leucine, threonine, etc.

(5) The organic acids adsorbed on the resin may be recovered by elution with some eluant and used as raw materials in the production of organic acids.

While the process according to the present invention is applicable to any glutamic acid fermentation broth irrespective of the species of organism and of the type of culture medium employed, it is particularly suitable for the treatment of the broth which is low in the concentration of impurities other than organic acids. In this sense, the broth obtained by employing an organic acid as a main carbon source is preferably employed in the present invention.

For instance, a fermentation broth obtained by using acetic acid as a main carbon source of the micro-organism employed contains, besides ammonium glutamate, organisms, soluble impurities such as organic acids, crystallization inhibitors, coloring matters, etc. Among those impurities, the organisms may be removed, if required, in a conventional manner, e.g. centrifugation or filtration.

According to the present invention, the above mentioned soluble impurities in the broth can be substantially completely removed by contacting the said broth with a strongly basic anion exchange resin. The resulting effluent from the resin is low in impurity, and when it is concentrated after adding sodium hydroxide, a high purity grade of MSG is directly crystallized in a good yield.

If the broth contains excessive inorganic cationic substances (e.g. salts of $Ca^{+++}$, $Mg^{++}$, $Fe^{++}$, $Fe^{+++}$), it is preferable to previously treat the broth with cation exchange resin to remove them. The organic neutral materials in the broth, if present, come in the effluent but do no harm in the crystallization step of MSG, since substantially all of them remain in the mother liquor and is not captured in the MSG crystals (see Experiment 3).

If coloring impurities still appear in the effluent, it can be removed by the treatment with a small amount of activated carbons.

According to the present invention, the strongly basic anion exchange resin is employed regardless of types of resins.

More specifically, use may be made of, for example, Amberlite IRA 400, 410, 900 and 910 (Rohm & Haas Co.), Dowex 1, 2, 21K and 11 (Dow Chemical Co.), Diaion DA–320 Diaion SA–10 and SA–20, Diaion PA–300 and PA–400 (All by Mitsubishi Kasei Co.), Duolite A–102D (Diamond Shamrock Co.) and the like.

For the adsorption, the resin is preferably in OH form, although Cl form or a combination of these forms may at times be used.

The resin is employed in an amount enough to substantially adsorb the soluble impurities in the broth and not too excess to adsorb glutamic acid itself. Thus, preferably from about 0.2 to about 0.6, most desirably from about 0.31 to about 0.56 molecular equivalent, of the anionic impurities in the broth is run relative to 1 litre by wet volume of the resin (see Experiment 1).

The contact between the broth and the resin may be effected either through column or batchwise, although the formed is preferred for commercial purposes.

The contact is desirably at a pH between 5 and 8, but may be effected at a pH between 5 and 9 (see, Experiment 2). Thus, the broth may usually as such be run onto the column. The contacts at a pH below 5 is impossible since crystals of glutamic acid separate out during the procedure.

Generally, the operating temperature is preferably below 60° C. in consideration of the possible degradation of the broth, the useful life of the resin and other factors.

In case of a column being employed for the contact the feeding velocity of the broth is preferably in the range of from about 1 to about 2 in terms of liquid hourly space velocity (hereinafter merely referred to as a space velocity).

When removing the impurities under such conditions, removal of the microorganisms from the glutamic acid broth is not essential. However, to provide for a large exchange capacity and also for a sufficient and ready regeneration, it is desirable to centrifugally separate the organisms from the broth before allowing it to contact the resin. In order to obtain a solution of monosodium glutamate, substantially a stiochiometric amount of sodium hydroxide solution is added to the effluent, which is then concentrated. Preferably, the final pH of the concentrate is from about 6.5 to about 7.5.

Thus obtained crystals satisfy the Japanese Standards Food Additives,

Percentages in experiments and examples are expressed as weight/weight, if not specifically mentioned and parts by weight bear the same relation to parts by volume as do gram(s) to milliliter(s).

EXPERIMENT 1

Relative amount of resin against organic acids (representing soluble impurities)

A fermentation broth (containing 68 mg./ml. of glutamic acid and 12 mg./ml. of organic acids) is run on 1 litre by wet volume of Amberlite IRA-900 (OH form) at space velocity 1.0, and the concentration of glutamic acid and organic acids in the effluent is assayed.

The organic acids are calculated as α-keto-glutaric acid.

| pH: | Adsorption [1] |
|---|---|
| 5 | 90.0 |
| 6 | 90.0 |
| 6.7 | 90.0 |
| 8 | 87.0 |
| 9 | 84.0 |
| 10 | 62.0 |

[1] Rate of organic acids on resin (percent).

EXPERIMENT 3

Concomitance of impurities in MSG crystals

MSG containing 6% of organic acids and 5% of organic neutral substances (sugar-like substances) is recrystallized by concentration of its 50% aqueous solution (weight/volume). 0.6% of organic acids is confirmed but organic neutral substances are not detected in the resultant crystals.

EXAMPLE 1

10,000 parts by volume of a glutamic acid fermentation broth (pH 7.5) which is obtained by employing ammonium acetate as a main carbon source is centrifuged to remove the microorganisms, whereupon 9800 parts by volume of a fluid is obtained. This fluid contains 660 parts by weight glutamic acid and 130 parts by weight of soluble impurity (of which organic acids account for 90 percent). The fluid is passed through a column packed with 2000 parts by wet volume of Amberlite IRA-900 (OH form) at the rate of 2000 parts by volume per hour. The procedure yields 11,000 parts by volume of a purified fluid, inclusive of the washings. This purified fluid contains only a trace of organic acid. A portion of the fluid, which contains 600 g. parts by weight of glutamic acid, is taken and added to an aqueous solution containing 160 parts by weight of sodium hydroxide, and the mixture is concentrated. The concentration is stopped when the volume of the mixture is 2,000 parts by volume, and 20 parts by weight of activated carbon powder is added. Filtration of the mixture yields a substantially colorless, clear filtrate. The filtrate is further concentrated and when its volume is 1,000 parts, 15 parts by weight of seed crystals is added. Concentration is continued to allow the crystals to grow. When the volume of the system is 700 parts, the fluid is cooled to 25° C. and the crystals are recovered washed with water and dried. The above procedure yields 435 parts by weight of MSG as crystals. Analyses show that this product has a purity of 99.8%. Those odorless, white crystals satisfy all the requirements set forth in the Japanese Standards of Food Additives.

| 1. Molecular equivalent of organic acids/1 litre by wet volume of resin | 0.07 | 0.154 | 0.200 | 0.231 | 0.310 | 0.385 | 0.462 | 0.541 | 0.600 | 0.620 | 0.695 |
|---|---|---|---|---|---|---|---|---|---|---|---|
| 2. Adsorption rate of organic acids on resin (percent) | 100 | 100 | 100 | 100 | 100 | 100 | 98 | 94 | 90 | 80 | 70 |
| 3. Recovery of glutamic acid (percent) | 71 | 84 | 90 | 94 | 98 | 100 | 100 | 100 | 100 | 100 | 100 |

In case that less than 0.2 molecular equivalent of organic acids is run relative to 1 litre by wet volume of resin, more than 10% of glutamic acid is adsorbed on the resin. On the other hand, in the presence of more than 0.6 molecular equivalent of organic acids, a considerable amount (more than 10%) of organic acids appears in the effluent.

EXPERIMENT 2

The relation between pH of broth and adsorption of organic acids on resin 100 ml. each of the fermentation filtrate, which contains 64 mg./ml. of glutamic acid and 7 mg./ml. of organic acids, is allowed to contact with 20 ml. of Amberlite IRA 900 (Cl from) at pH 5, 6, 6.7, 8, 9 and 10, respectively and, after 1 hour's agitation, is filtered. The adsorption rate of organic acids is calculated on the remaining organic acids in the filtrate.

The mother fluid is further concentrated, and is then cooled to 25° C. The resulting crystals are recovered to obtain 250 parts by weight of MSG as crystals.

The product has a purity of 99.8%. Those colorless, white crystals satisfy all the requirements of the Japanese Standards of Food Additives.

The overall yield is 90%. The overall yields of MSG obtained by treating portions of the same broth by the conventional methods (1) and (2) are 80.4% and 84.0%, respectively.

EXAMPLE 2

With the use of a filter aid, 10,000 parts by volume of a glutamic acid fermentation broth obtained in the same manner as in Example 1 is filtered to obtain 9,500 parts by volume of a filtrate free of the organisms (pH 8.0).

The filtrate contains 620 parts by weight of glutamic acid and 110 parts by weight of soluble impurities.

This filtrate is run onto a column packed with 2,000 parts by wet volume of Amberlite IRA-402 (OH form)

at the rate of 2,000 parts by volume per hour, whereupon 10,500 parts by volume of a purified fluid is obtained, inclusive of the washings.

The effluent contains 615 parts by weight of glutamic acid and 2.1 parts by weight of organic acids. A portion of the purified fluid, which contains 600 parts by weight of glutamic acid, is taken and 160 parts by weight of sodium hydroxide is added.

The fluid is concentrated, and when its volume is 2,000 parts by volume, concentration is stopped. The concentrate is purified by passage through a column containing 400 parts by volume of activated carbon. The purified fluid is concentrated and when its volume is 1,000 parts by volume, 15 parts by weight of seed crystals are added. The system is concentrated to a liquid volume of 600 parts and the resulting crystals are recovered at 50° C., washed with water and dried. The procedure yields 460 parts by weight of MSG as crystals. Analyses show that the crystals have a purity of 99.9%. Those odorless, white crystals satisfy all the requirements of the Japanese Standards of Food Additives. The mother fluid is subjected to the same procedure as in Example 1 to recover remaining MSG. The procedure yields 240 parts by weight of MSG as crystals.

EXAMPLE 3

An organic high polymer flocking agent is added to 40,000 parts by volume of a glutamic acid fermentation broth obtained in the same manner as in Example 1 to flocculate the organisms, and the broth is then allowed to stand. The procedure yields 38,000 parts by volume of a fluid substantially free of the organisms. The fluid contains 2,600 parts by weight of glutamic acid and about 400 parts by weight of soluble impurities.

The fluid is filtered with a filter aid to obtain a clear fluid (pH 7.0), which is then passed through a previously prepared column containing 4,000 parts by wet volume of Amberlite IRA-910 (Cl form). The effluent is further passed through a column packed with 4,000 parts by volume of the OH form of the same resin, whereupon 42,000 parts by volume of a substantially colorless purified fluid is obtained. This fluid is free of organic acid. 40,000 parts by volume of said fluid is mixed with 660 parts by weight of sodium hydroxide and concentrated until its volume is 8,000 parts by volume and 80 parts by weight of activated carbon powder is added. Filtration gives a clear MSG solution, which contains about 2,400 parts by weight of glutamic acid. The filtrate is further concentrated and when its volume is 4,000 parts, 60 parts by weight of seed crystals of MSG are added. Concentration is continued until the volume of the system is 3,000 parts and the resulting crystals are recovered at 50° C. washed with water and dried. The procedure yields 1,750 parts by weight of crystalline MSG. The purity is 99.9%. This product therefore satisfies all the requirements of the Japanese Standards of Food Additives. The mother fluid remaining after the recovery of the crystals is further concentrated to obtain 900 parts by weight of MSG as crystals. This product has a purity of 99.8%. It therefore satisfies the requirements of the above Standards.

The mother fluid remaining after the immediately preceding step is further concentrated until the concentration of glutamic acid is 26%, followed by the addition of hydrochloric acid to adjust the pH to 3. The procedure yields 300 parts by weight of glutamic acid as crystals.

The glutamic acid content of those crystals is 92.7%. The overall yield is 92.0%.

EXAMPLE 4

10,000 parts by volume of a glutamic acid fermentation broth is obtained by employing glucose as a main carbon source of the starting medium.

The broth is centrifuged to give 9700 parts by volume of a fluid which contains 600 parts by weight of glutamic acid, 100 parts by volume of soluble impurities (of which organic acids account for 85 percent). The fluid is passed through a column packed with 1,300 parts by wet volume of Diaion DA-320 (OH form) at space velocity 1.0, whereby 11,000 parts by volume of the purified effluent, inducive of the washings is obtained. To a portion of the effluent, which contains 550 parts by weight of glutamic acid and only a trace of organic acids, is added to 150 parts by weight of sodium hydroxide. The mixture is concentrated 1,000 parts by volume and, after adding 15 parts by weight of seed crystals of MSG, further concentrated up to 700 parts by volume at 50° C. to crystalize MSG. The resulting crystals are washed and dried to obtain 365 parts by weight of MSG (purity 99.6%). Further concentration of the mother fluid gives 228 parts by weight of MSG (purity 99.2%). The overall yield is 80%.

EXAMPLE 5

A glutamic acid fermentation is carried out in the same manner as Belgium Pat. 698053, employing n-paraffins as carbon sources. 10,000 parts by volume of the resultant fermentation broth is centrifuged to remove organisms and the remaining n-paraffins. 9700 parts by volume of the supernatant fluid contains 550 parts by weight of glutamic acid and 50 parts by weight of soluble impurities (of which organic acids account for 95%). This fluid is run on a series of columns, one packed with 2,000 parts by wet volume of Amberlite IRC 50 (NH4 from), and the other packed with 1,500 parts by wet volume of Diaion DA-320 (OH form) at a rate of 1,500 parts by volume/hour. Thus, 12,000 parts by volume of the effluent including the washings is obtained. The effluent contains only trace of organic acids. 140 parts by weight of sodium hydroxide is added to a portion of the effluent containing 500 parts by weight of glutamic acid.

The mixture is concentrated to 1,000 parts by volume and filtered in the presence of 20 parts by weight of activated carbon-powder the filtrate is concentrated again to 900 parts by volume and, after adding 10 parts by weight of seed crystals, further concentrated to 650 parts by volume at 50° C. to crystallize MSG. The crystals are washed and dried to give 340 parts by weight of MSG (purity 99.5%). The mother fluid is further concentrated to give 225 parts by weight of MSG as crystals (purity 99.3%). The overall yield is 84.0%.

Exemplary of suitable microorganisms for fermentation include, those belonging to the genus Micrococcus or Brevibacterium. Thus, the broths of Examples 1 to 3 are obtained by incubating *Brevibacterium flavum* ATCC 13826; the broth of Example 4 is produced by culturing *Micrococcus glutamicus* ATCC 13032.

What we claim is:

1. Process for producing monosidium glutamate, which comprises contacting a glutamic acid fermentation broth at a pH between about 5 and about 9 with an amount of 1 litre by wet volume of a strongly basic anion exchange resin relative to about 0.2 to 0.6 molecular equivalent at the anionic impurities contained in said broth; adding to the effluent from the resin a stoichiometric amount of sodium hydroxide relative to the glutamic acid contained therein; and recovering the crystals of monosodium glutamate thus obtained.

2. The process claimed in claim 1, wherein said strongly basic anion exchange resin is of OH form.

References Cited

UNITED STATES PATENTS

| | | | |
|---|---|---|---|
| 3,015,655 | 2/1962 | Stark | 260—527 |
| 3,336,374 | 8/1967 | Dobry | 260—527 |
| 3,565,951 | 2/1971 | Ishida et al. | 260—527 |

OTHER REFERENCES

Greenstein et al., Chem. of the Amino Acids, vol. 2, 1961, pp. 1452–1456.

JAMES A. PATTEN, Primary Examiner

V. GARNER, Assistant Examiner